US012658182B2

(12) United States Patent
    Zou et al.

(10) Patent No.: US 12,658,182 B2
(45) Date of Patent: Jun. 16, 2026

(54) SPEECH WAKE-UP METHOD, ELECTRONIC DEVICE, AND STORAGE MEDIUM

(71) Applicant: Beijing Baidu Netcom Science Technology Co., Ltd., Beijing (CN)

(72) Inventors: Saisai Zou, Beijing (CN); Lei Jia, Beijing (CN); Haifeng Wang, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 143 days.

(21) Appl. No.: 18/706,313

(22) PCT Filed: Jan. 17, 2023

(86) PCT No.: PCT/CN2023/072618
    § 371 (c)(1),
    (2) Date: Apr. 30, 2024

(87) PCT Pub. No.: WO2024/011885
    PCT Pub. Date: Jan. 18, 2024

(65) Prior Publication Data
    US 2024/0420684 A1      Dec. 19, 2024

(30) Foreign Application Priority Data
    Jul. 15, 2022    (CN) .......................... 202210838284.6

(51) Int. Cl.
    *G10L 15/00*       (2013.01)
    *G10L 13/02*       (2013.01)
    (Continued)

(52) U.S. Cl.
    CPC .............. *G10L 15/16* (2013.01); *G10L 13/02* (2013.01); *G10L 15/02* (2013.01); *G10L 2015/027* (2013.01); *G10L 2015/088* (2013.01)

(58) Field of Classification Search
    CPC ....... G10L 15/16; G10L 19/005; G10L 19/00; G10L 25/27; G10L 25/30; G10L 15/12;
    (Continued)

(56) References Cited

U.S. PATENT DOCUMENTS 9,275,637 B1 * 3/2016 Salvador ................. G10L 15/06
10,854,193 B2   12/2020 Fu et al.
            (Continued)

FOREIGN PATENT DOCUMENTS

CN          102999161          3/2013
CN          106098059          11/2016
            (Continued)

OTHER PUBLICATIONS

Extended European Search Report, issued in the corresponding European patent application No. EP23838387.1, dated Dec. 23, 2024, 32 pages.
            (Continued)

*Primary Examiner* — Vu B Hang
(74) *Attorney, Agent, or Firm* — HSML P.C.

(57)          ABSTRACT

A speech wake-up method, an electronic device, and a storage medium are provided. The method includes: performing a word recognition on a speech to be recognized to obtain a wake-up word recognition result (S210); performing a syllable recognition on the speech to be recognized to obtain a wake-up syllable recognition result, in response to determining that the wake-up word recognition result represents that the speech to be recognized contains a predetermined wake-up word (S220); and determining that the speech to be recognized is a correct wake-up speech, in response to determining that the wake-up syllable recognition result represents that the speech to be recognized contains a predetermined syllable (S230).

12 Claims, 5 Drawing Sheets

(51) Int. Cl.
G10L 15/02 (2006.01)
G10L 15/16 (2006.01)
*G10L 15/08* (2006.01)

(58) Field of Classification Search
CPC ....... G10L 15/02; G10L 15/063; G10L 15/07;
G10L 15/20; G10L 15/22; G10L 15/26;
G10L 15/30; G10L 15/14; G10L 15/1815;
G10L 15/187; G10L 17/18; G10L
2015/027; G10L 2015/088; G10L 17/02;
G10L 17/24; G10L 15/32; G10L 17/04;
G10L 13/02
See application file for complete search history.

(56) References Cited

U.S. PATENT DOCUMENTS

| | | | | |
|---|---|---|---|---|
| 11,132,992 | B2 * | 9/2021 | Stoimenov | G06N 3/084 |
| 11,238,870 | B2 * | 2/2022 | Xu | G10L 17/06 |
| 2020/0219486 | A1 | 7/2020 | Fu et al. | |
| 2021/0016431 | A1 * | 1/2021 | Kim | B25J 19/026 |
| 2022/0013111 | A1 | 1/2022 | Chen et al. | |
| 2023/0090590 | A1 | 3/2023 | Fu et al. | |

FOREIGN PATENT DOCUMENTS

| | | |
|---|---|---|
| CN | 107767863 | 3/2018 |
| CN | 110097870 | 8/2019 |
| CN | 110473536 | 11/2019 |
| CN | 110838289 | 2/2020 |
| CN | 111429889 | 7/2020 |
| CN | 111883117 | 11/2020 |
| CN | 112420050 | 2/2021 |
| CN | 112466288 | 3/2021 |
| CN | 113299282 | 8/2021 |
| CN | 113889076 | 1/2022 |
| CN | 114078472 | 2/2022 |
| CN | 114242065 | 3/2022 |
| CN | 115223573 | 10/2022 |
| JP | 2019-046453 | 3/2019 |
| JP | 2019091472 | 6/2019 |
| JP | 2020-507815 | 3/2020 |
| JP | 2020-144626 | 9/2020 |

OTHER PUBLICATIONS

You Xinya et al., "Two-stage Strategy for Small-footprint Wake-up-word Speech Recognition System", 2020 International Joint Conference on Neural Networks, Jul. 19, 2020, pp. 1-6.
International Search Report and Written Opinion, issued in the corresponding PCT application No. PCT/CN2023/072618, dated May 5, 2023, 16 pages.
First Chinese Office Action, issued in corresponding Chinese Application No. 202210838284.6, dated Jan. 16, 2023, 22 pages (with machine translation).
Second Chinese Office Action, issued in corresponding Chinese Application No. 202210838284.6, dated Feb. 19, 2023, 20 pages (with machine translation).
Third Chinese Office Action, issued in corresponding Chinese Application No. 202210838284.6, dated Apr. 28, 2023, 23 pages (with machine translation).
Chinese Office Action, issued in corresponding Chinese Application No. 202210838284.6, dated Aug. 4, 2023, 12 pages.
First Chinese Office Action, issued in corresponding Chinese Application No. 202210839668.X, dated Jan. 16, 2023, 20 pages (with machine translation).
Second Chinese Office Action, issued in corresponding Chinese Application No. 202210839668.X, dated Mar. 31, 2023, 17 pages (with machine translation).
Third Chinese Office Action, issued in corresponding Chinese Application No. 202210839668.X, dated Aug. 1, 2023, 17 pages (with machine translation).
Zhang et al., "Hello Edge: Keyword Spotting on Microcontrollers", Stanford University, Feb. 14, 2018, 14 pages.
Ravanelli et al., "Light Gated Recurrent Units for Speech Recognition", IEEE Transactions on Emerging Topics in Computational Intelligence, vol. 2, No. 2, 2018, 11 pages.

* cited by examiner

<u>100</u>

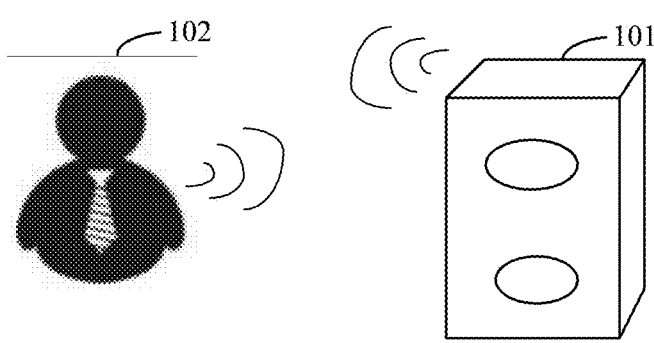

FIG. 1

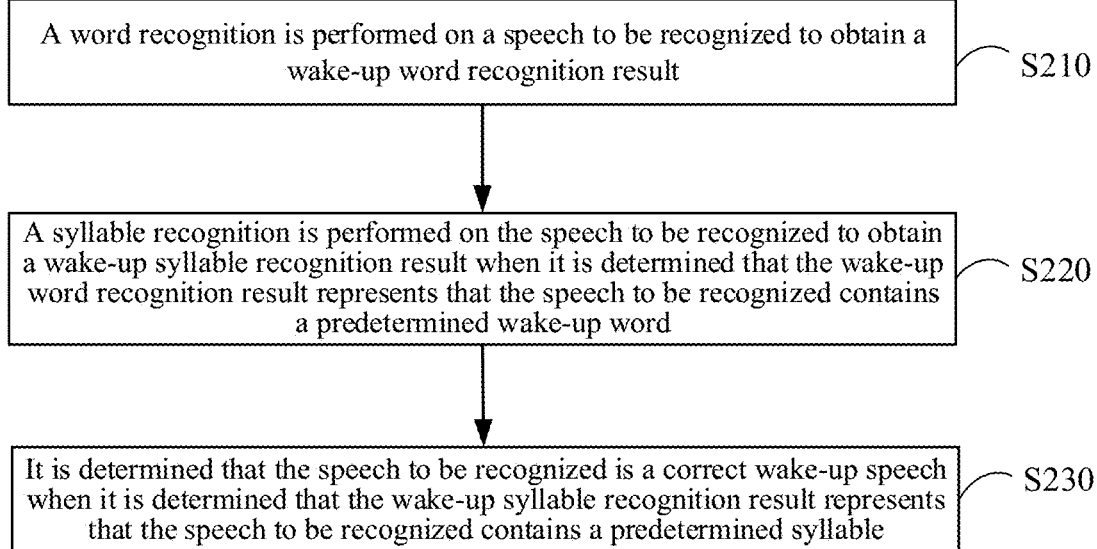

A word recognition is performed on a speech to be recognized to obtain a wake-up word recognition result ⌒ S210

A syllable recognition is performed on the speech to be recognized to obtain a wake-up syllable recognition result when it is determined that the wake-up word recognition result represents that the speech to be recognized contains a predetermined wake-up word ⌒ S220

It is determined that the speech to be recognized is a correct wake-up speech when it is determined that the wake-up syllable recognition result represents that the speech to be recognized contains a predetermined syllable ⌒ S230

SPEECH WAKE-UP METHOD, ELECTRONIC DEVICE, AND STORAGE MEDIUM

CROSS-REFERENCE TO RELATED APPLICATION(S)

This application corresponds to PCT Application No. PCT/CN2023/072618, which claims priority to Chinese Patent Application No. 202210838284.6 filed on Jul. 15, 2022, the contents of which are incorporated herein by reference in their entireties.

TECHNICAL FIELD

The present disclosure relates to a field of artificial intelligence technology, in particular to fields of human-computer interaction, deep learning and intelligent speech technologies. Specifically, the present disclosure relates to a speech wake-up method, an electronic device, and a storage medium.

BACKGROUND

A speech interaction is a natural way of a human interaction. With a continuous development of the artificial intelligence technology, it has been achieved that a machine may understand a human speech, understand an inherent meaning of a speech, and give a corresponding feedback. In these operations, a speed of response to wake-up, a difficulty of wake-up, an accurate understanding of semantics, and a speed of giving feedback are all factors that affect a smoothness of the speech interaction.

SUMMARY

The present disclosure provides a speech wake-up method, an electronic device, and a storage medium.

According to an aspect of the present disclosure, a speech wake-up method is provided, including: performing a word recognition on a speech to be recognized to obtain a wake-up word recognition result; performing a syllable recognition on the speech to be recognized to obtain a wake-up syllable recognition result, in response to determining that the wake-up word recognition result represents that the speech to be recognized contains a predetermined wake-up word; and determining that the speech to be recognized is a correct wake-up speech, in response to determining that the wake-up syllable recognition result represents that the speech to be recognized contains a predetermined syllable.

According to another aspect of the present disclosure, an electronic device is provided, including: at least one processor; and a memory communicatively connected to the at least one processor, where the memory stores instructions executable by the at least one processor, and the instructions, when executed by the at least one processor, cause the at least one processor to implement the method described in the present disclosure.

According to another aspect of the present disclosure, a non-transitory computer-readable storage medium having computer instructions therein, where the computer instructions are configured to cause a computer to implement the method described in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, in which:

FIG. 1 schematically shows an exemplary system architecture to which a speech wake-up method and apparatus may be applied according to embodiments of the present disclosure;

FIG. 2 schematically shows a flowchart of a speech wake-up method according to embodiments of the present disclosure;

DETAILED DESCRIPTION OF EMBODIMENTS

Figure 3:
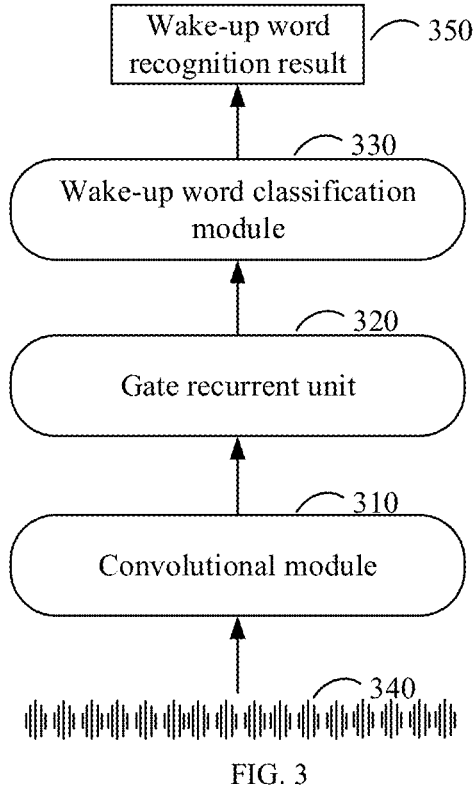
FIG. 3 schematically shows a network structure diagram of a wake-up word recognition model according to embodiments of the present disclosure.

Exemplary embodiments of the present disclosure will be described below with reference to the accompanying drawings, which include various details of embodiments of the present disclosure to facilitate understanding and should be considered as merely exemplary. Therefore, those ordinary skilled in the art should realize that various changes and modifications may be made to embodiments described herein without departing from the scope and spirit of the present disclosure. Likewise, for clarity and conciseness, descriptions of well-known functions and structures are omitted in the following description.

The present disclosure provides a speech wake-up method and apparatus, an electronic device, a storage medium, and a program product.

According to an aspect of the present disclosure, a speech wake-up method is provided, including: performing a word recognition on a speech to be recognized to obtain a wake-up word recognition result; performing a syllable recognition on the speech to be recognized to obtain a wake-up syllable recognition result, in response to determining that the wake-up word recognition result represents that the speech to be recognized contains a predetermined wake-up word; and determining that the speech to be recognized is a correct wake-up speech, in response to determining that the wake-up syllable recognition result represents that the speech to be recognized contains a predetermined syllable.

In technical solutions of the present disclosure, a collection, a storage, a use, a processing, a transmission, a provision, a disclosure, an application and other processing of user personal information involved comply with provisions of relevant laws and regulations, take necessary security measures, and do not violate public order and good custom.

In the technical solutions of the present disclosure, the acquisition or collection of user personal information has been authorized or allowed by users.

FIG. 1 schematically shows an application scenario diagram of a speech wake-up method and apparatus according to embodiments of the present disclosure.

It should be noted that FIG. 1 is just an example of the application scenario to which embodiments of the present disclosure may be applied, so as to help those skilled in the art understand technical contents of the present disclosure. However, it does not mean that embodiments of the present disclosure may not be applied to other devices, systems, environments or scenarios.

As shown in FIG. 1, a speech to be recognized may be sent from a user 102 to a speech interaction device 101. The speech interaction device 101 may determine whether the speech to be recognized is a correct wake-up speech. When it is determined that the speech to be recognized is the correct wake-up speech, the speech interaction device 101 may collect an instruction speech containing an intent information of the user and perform an intent operation in the instruction speech, so that a human-machine interaction between the user 102 and the speech interaction device 101 may be achieved.

The speech interaction device 101 may be installed with various communication client applications, such as knowledge reading applications, web browser applications, search applications, instant messaging tools, email clients and/or social platform software, etc. (just for example).

The speech interaction device 101 may include a speech collector, such as a microphone, to collect the speech to be recognized and the instruction speech containing the intent information of the user 102. The speech interaction device 101 may further include a speech player, such as a speaker, to play a speech produced by the speech interaction device.

The speech interaction device 101 may be any electronic device that may interact through speech signals. The speech interaction device 101 may include but not be limited to a smart phone, a tablet computer, a laptop computer, a smart home appliance, a smart speaker, a vehicle speaker, a smart learning machine, or a smart robot, etc.

It should be noted that a syllable recognition model and a keyword recognition model provided in embodiments of the present disclosure are loaded in the speech interaction device 101, and a speech processing method may generally be performed by the speech interaction device 101. Accordingly, a speech processing apparatus provided in embodiments of the present disclosure may also be provided in the speech interaction device 101. The terminal device may implement the speech wake-up method and apparatus provided in embodiments of the present disclosure without interacting with a server.

However, the present disclosure is not limited to this. In other embodiments of the present disclosure, the speech interaction device may transmit the speech to be recognized to a server through a network, and the server may be used to process the speech to be recognized to determine whether the speech to be recognized is a correct wake-up speech.

It should be noted that a sequence number of each operation in the following methods is just used to represent the operation for ease of description, and should not be regarded as indicating an execution order of each operation. Unless explicitly stated, the methods do not need to be performed exactly in the order shown.

FIG. 2 schematically shows a flowchart of a speech wake-up method according to embodiments of the present disclosure.

As shown in FIG. 2, the method includes operations S210 to S230.

In operation S210, a word recognition is performed on a speech to be recognized to obtain a wake-up word recognition result.

In operation S220, a syllable recognition is performed on the speech to be recognized to obtain a wake-up syllable recognition result when it is determined that the wake-up word recognition result represents that the speech to be recognized contains a predetermined wake-up word.

In operation S230, it is determined that the speech to be recognized is a correct wake-up speech when it is determined that the wake-up syllable recognition result represents that the speech to be recognized contains a predetermined syllable.

According to embodiments of the present disclosure, the speech to be recognized may be a wake-up speech. The wake-up speech may refer to a speech signal that is received before a speech interaction function is awakened, which may include, for example, a speech containing a wake-up word or a speech containing a non-wake-up word.

According to embodiments of the present disclosure, the correct wake-up speech may refer to a speech containing a wake-up word, or a speech that may wake up the speech interaction function. When it is determined that the speech to be recognized is the correct wake-up speech, the speech interaction function of the speech interaction device may be triggered. When it is determined that the speech to be recognized is an incorrect wake-up speech, an operation may be stopped, and no response is given to the user.

According to embodiments of the present disclosure, the speech interaction function may refer to a function of receiving an interactive speech from the user and outputting a speech feedback result corresponding to the interactive speech to the user.

According to embodiments of the present disclosure, performing a word recognition on the speech to be recognized may refer to performing a recognition on the speech to be recognized for a wake-up word. A wake-up word recognition result may be obtained by performing a word recognition on the speech to be recognized. The wake-up word recognition result may represent whether the speech to be recognized contains the predetermined wake-up word.

According to embodiments of the present disclosure, performing a word recognition on the speech to be recognized refers to performing a recognition on the speech to be recognized from a global or overall aspect to obtain a wake-up word recognition result. For example, if the predetermined wake-up word is " 小 D (Xiao D)", and the speech to be recognized is " 小 D 你好 (Hello, Xiao D)", then it is possible to obtain a wake-up word recognition result representing that the speech to be recognized contains the predetermined wake-up word after performing a word recognition on the speech to be recognized.

According to other embodiments of the present disclosure, based on the wake-up word recognition result, it is possible to determine whether the speech to be recognized is the correct wake-up speech. For example, when it is determined that the wake-up word recognition result represents that the speech to be recognized contains the predetermined wake-up word, it may be determined that the speech to be recognized is the correct wake-up speech, and a human-computer interaction function may be enabled. When it is determined that the wake-up word recognition result represents that the speech to be recognized does not contain the predetermined wake-up word, it may be determined that the speech to be recognized is an incorrect wake-up speech, and no response is given.

According to embodiments of the present disclosure, when it is determined that the wake-up word recognition result represents that the speech to be recognized contains the predetermined wake-up word, a syllable recognition may be performed on the speech to be recognized to obtain a wake-up syllable recognition result.

According to embodiments of the present disclosure, performing a syllable recognition on the speech to be recognized may refer to: performing a syllable recognition corresponding to the wake-up word on the speech to be recognized to obtain the wake-up syllable recognition result. The wake-up syllable recognition result represents whether the speech to be recognized contains a predetermined syllable. The predetermined syllable may refer to a syllable corresponding to the predetermined wake-up word.

According to embodiments of the present disclosure, performing a syllable recognition on the speech to be recognized refers to performing a recognition on the speech to be recognized from a local aspect or from a token unit. For example, the predetermined wake-up word "小 D (Xiao D)" corresponds to two predetermined syllables, including a syllable of "小 (Xiao)" and a syllable of "D". If the speech to be recognized is "小 D 你好 (Hello, Xiao D)", it is possible to obtain a wake-up word recognition result representing that the speech to be recognized contains the predetermined syllable after performing a syllable recognition on the speech to be recognized.

According to embodiments of the present disclosure, when it is determined that the wake-up syllable recognition result represents that the speech to be recognized contains the predetermined syllable, it is determined that the speech to be recognized is the correct wake-up speech. When it is determined that the wake-up syllable recognition result represents that the speech to be recognized does not contain the predetermined syllable, it is determined that the speech to be recognized is an incorrect wake-up speech.

According to other embodiments of the present disclosure, it is possible not to perform a word recognition on the speech to be recognized, but only perform a syllable recognition on the speech to be recognized to obtain a wake-up syllable recognition result. It may be determined whether the speech to be recognized is the correct wake-up speech based on the wake-up syllable recognition result. For example, when it is determined that the wake-up syllable recognition result represents that the speech to be recognized contains the predetermined syllable, it is determined that the speech to be recognized is the correct wake-up speech, and the human-computer interaction function may be enabled. When it is determined that the wake-up syllable recognition result represents that the speech to be recognized does not contain the predetermined syllable, it is determined that the speech to be recognized is an incorrect wake-up speech, and no response is given.

According to embodiments of the present disclosure, different from the methods of determining whether the speech to be recognized is the correct wake-up speech based solely on the wake-up word recognition result, or determining whether the speech to be recognized is the correct wake-up speech based solely on the wake-up syllable recognition result, in the method of "performing a syllable recognition on the speech to be recognized to obtain a wake-up syllable recognition result when it is determined that the wake-up word recognition result represents that the speech to be recognized contains the predetermined wake-up word, and determining whether the speech to be recognized is the correct wake-up speech based on the wake-up syllable recognition result" provided in embodiments of the present disclosure, a word unit recognition for the wake-up word may be performed on the speech to be recognized by using the word recognition operations, and a character unit recognition for the wake-up word may be performed on the speech to be recognized by using the syllable recognition operations, so that the recognition may be performed on the speech to be recognized in both global and local aspects, and then the wake-up accuracy may be ensured and the wake-up false positive may be avoided when the number of characters in the wake-up word is less than 4, such as 3 or 2.

According to other embodiments of the present disclosure, for operation S210 as shown in FIG. 2, performing a word recognition on the speech to be recognized to obtain a wake-up word recognition result may further include: performing a convolution on the speech to be recognized to obtain a first-level feature vector sequence; performing a gate recurrent operation on the first-level feature vector sequence to obtain a second-level feature vector sequence; and performing a classification on the second-level feature vector sequence to obtain the wake-up word recognition result.

According to embodiments of the present disclosure, the speech to be recognized may include a speech frame sequence. The first-level feature vector sequence corresponds to the speech frame sequence.

According to embodiments of the present disclosure, a wake-up word recognition model may be used to perform the word recognition on the speech to be recognized to obtain the wake-up word recognition result. However, the present disclosure is not limited to this, and other methods may also be used to perform the word recognition on the speech to be recognized, as long as the method is a word recognition method that may obtain the wake-up word recognition result.

FIG. 3 schematically shows a network structure diagram of a wake-up word recognition model according to embodiments of the present disclosure.

As shown in FIG. 3, the wake-up word recognition model includes a convolutional module 310, a gate recurrent unit 320, and a wake-up word classification module 330 arranged in sequence.

As shown in FIG. 3, a speech to be recognized 340 is input into the convolutional module 310 to obtain a first-level feature vector sequence. The first-level feature vector sequence is input into the gate recurrent unit 320 to obtain a second-level feature vector sequence. The second-level feature vector sequence is input into the wake-up word classification module 330 to obtain a wake-up word recognition result 350.

According to embodiments of the present disclosure, the wake-up word recognition model is not limited to include one convolutional module, and may also include a plurality of stacked convolutional modules. Similarly, the wake-up word recognition model may also include a plurality of stacked gate recurrent units.

According to embodiments of the present disclosure, the convolutional module may include CNN (Convolutional Neural Networks), RNN (Recurrent Neural Network), or LSTM (Long Short-Term Memory), etc., or a combination thereof.

According to embodiments of the present disclosure, the wake-up word classification module may include a fully connected layer and an activation function. The activation function may be a Softmax activation function, but it is not limited thereto, and may also be a Sigmoid activation function. The number of layers of the fully connected layer is not limited, which may be, for example, one or more.

According to embodiments of the present disclosure, the gate recurrent unit may refer to, but is not limited to GRU (Gate Recurrent Unit), and may also be a GRU-derived module, for example, a GRU-derived module obtained by lightweighting GRU.

According to embodiments of the present disclosure, the use of the GRU-derived module, also known as a Projected Light-GRU module, is more helpful to load the wake-up word recognition model in a terminal device such as a speech interaction device, that is, achieve a lightweight deployment on the terminal side, and then ensure a real-time performance of a word recognition for the speech to be recognized.

According to other embodiments of the present disclosure, performing the gate recurrent operation on the first-level feature vector sequence to obtain the second-level feature vector sequence includes repeatedly performing the following operations: determining an update gate of a current moment and a candidate hidden layer information of the current moment based on an output vector of a previous moment and an input vector of the current moment, where the input vector of the current moment is a first-level feature vector at the current moment in the first-level feature vector sequence; determining a hidden layer information of the current moment based on the candidate hidden layer information of the current moment, a hidden layer information of the previous moment and the update gate of the current moment; determining an output vector of the current moment based on the hidden layer information of the current moment and a predetermined parameter, where the output vector of the current moment is a second-level feature vector at the current moment in the second-level feature vector sequence.

According to embodiments of the present disclosure, the predetermined parameter, also known as a projection param-eter, is determined based on a threshold of the number of lightweight parameters.

According to embodiments of the present disclosure, the threshold of the number of lightweight parameters may refer to a parameter setting benchmark, such as a specified threshold of the number of lightweight parameters. A size of the predetermined parameter is less than or equal to the threshold of the number of lightweight parameters, so as to reduce a data processing amount of the wake-up word recognition model.

According to embodiments of the present disclosure, the Projected Light-GRU module may be expressed by Equation (1) to Equation (4) as follows.

$$z_t = \sigma(BN(w_z x_t) + u_z o_{t-1}) \quad (1)$$

$$\hat{h}_t = g(BN(w_h x_t) + u_h o_{t-1}) \quad (2)$$

$$h_t = z_t \odot h_{t-1} + (1 - z_t)\hat{h}_t \quad (3)$$

$$o_t = w_o h_t \quad (4)$$

where $z_t$ represents an update gate of a moment t, with a range of (0, 1); $\delta$ (•) represents a sigmoid function; g (•) represents a Gaussian error linear unit activation function (such as GELU activation function); BN (•) represents a normalization function; $x_t$ represents an input vector of the moment t; $o_{t-1}$ represents an output vector of a moment (t−1); $o_t$ represents an output data of the moment t; $w_z$ and $u_z$ represent parameters related to the sigmoid function; $w_h$ and $u_h$ represent parameters related to the GELU activation function; $h_{t-1}$ represents a hidden layer information of the moment (t−1); $h_t$ represents a hidden layer information of the moment t; $w_o$ represents a projection parameter; $\hat{h}_t$ represents a candidate hidden layer information of the moment t.

According to embodiments of the present disclosure, compared with a standard GRU, in the Projected Light-GRU module provided in embodiments of the present disclosure, a reset gate is removed, and the predetermined parameter is introduced, so that a calculation amount of the wake-up word recognition model is reduced. When a wake-up word recognition model including the Projected Light-GRU mod-ule is applied to a speech interaction device, a resource overhead may be reduced while ensuring a high perfor-mance, so that the wake-up word recognition model loaded in the speech interaction device may be in a running state around the clock, and a wake-up response speed of the speech interaction device may be improved.

According to other embodiments of the present disclo-sure, for operation S220 as shown in FIG. 2, performing the syllable recognition on the speech to be recognized to obtain the wake-up syllable recognition result when it is deter-mined that the wake-up word recognition result represents that the speech to be recognized contains the predetermined wake-up word may further include: performing a syllable feature extraction on the speech to be recognized to obtain a syllable feature matrix; and performing a classification on the syllable feature matrix to obtain a wake-up syllable recognition result.

According to embodiments of the present disclosure, a syllable recognition model may be used to perform the syllable recognition on the speech to be recognized to obtain the wake-up syllable recognition result. However, the pres-ent disclosure is not limited to this, and other methods may also be used to perform the syllable recognition on the speech to be recognized, as long as the method is a syllable recognition method that may obtain the wake-up syllable recognition result.

Figure 4:
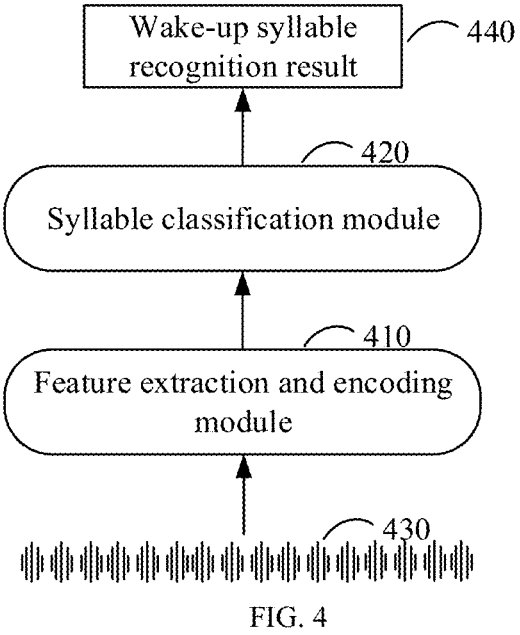
FIG. 4 schematically shows a network structure diagram of a wake-up syllable recognition model according to embodiments of the present disclosure.

FIG. 4 schematically shows a network structure diagram of a wake-up syllable recognition model according to embodiments of the present disclosure.

As shown in FIG. 4, the wake-up syllable recognition model includes a feature extraction and encoding module 410 and a syllable classification module 420 arranged in sequence.

As shown in FIG. 4, a speech to be recognized 430 is input into the feature extraction and encoding module 410 to perform a syllable feature extraction and output a syllable feature matrix. The syllable feature matrix is input into the syllable classification module 420 to perform a classification and output a wake-up syllable recognition result 440.

According to embodiments of the present disclosure, the syllable classification module may include a fully connected layer and an activation function. The activation function may be a Softmax activation function, but it is not limited thereto, and may also be a Sigmoid activation function. The number of layers of the fully connected layer is not limited, which may be, for example, one or more.

According to embodiments of the present disclosure, the feature extraction and encoding module may be constructed using a network structure in a Conformer model (convolu-tion augmentation-based encoder). However, the present disclosure is not limited to this, a Conformer module in the Conformer model may also be used, or a network structure obtained by performing lightweighting such as pruning on the Conformer model or the Conformer module may also be used.

According to embodiments of the present disclosure, performing the syllable feature extraction on the speech to be recognized to obtain the syllable feature matrix may further include: performing a feature extraction on the speech to be recognized to obtain a feature matrix; performing a dimension reduction on the feature matrix to obtain a dimension-reduced feature matrix; and performing a multi-stage speech-enhanced encoding on the dimension-reduced feature matrix to obtain the syllable feature matrix.

According to embodiments of the present disclosure, the feature extraction and encoding module may include a feature extraction layer, a dimension reduction layer, and an encoding layer arranged in sequence. The feature extraction layer may be used to perform a feature extraction on the speech to be recognized to obtain a feature matrix. The dimension reduction layer may be used to perform a dimension reduction on the feature matrix to obtain a dimension-reduced feature matrix. The encoding layer may be used to perform a multi-stage speech-enhanced encoding on the dimension-reduced feature matrix to obtain the syllable feature matrix.

According to embodiments of the present disclosure, the feature extraction layer may include at least one selected from: at least one relative sinusoidal positional encoding layer, at least one convolutional layer, or at least one feed forward layer (Feed Forward Module).

According to embodiments of the present disclosure, the encoding layer may include a Conformer module, which may include, for example, at least one selected from: a plurality of feed forward layers, at least one multi-headed attention mechanism layer (Multi-Headed Self-Attention module), or at least one convolutional layer.

According to embodiments of the present disclosure, the dimension reduction layer may include a mapping function. However, the present disclosure is not limited to this, and the dimension reduction layer may also include other layer structures for implementing a dimension reduction of a high-dimensional matrix to obtain a low-dimensional matrix.

According to embodiments of the present disclosure, by using the dimension reduction layer, an amount of data input into the encoding layer may be reduced, and then an amount of calculation of the syllable recognition model may be reduced. In addition, the number of stacked layers of the encoding layer may also be reduced. For example, the number of stacked layers of the encoding layer may be determined to be any one of 1 to 4 according to the threshold of the number of lightweight parameters.

According to embodiments of the present disclosure, by designing the dimension reduction layer in the wake-up syllable recognition model and controlling the number of stacked layers of the encoding layer, it is possible to achieve the lightweight and miniaturization of the syllable recogni-tion model while ensuring the recognition accuracy, so that the recognition efficiency may be improved, and an internal consumption of a processor of a terminal device may be reduced when the wake-up syllable recognition model is applied to the terminal device.

Figure 5:
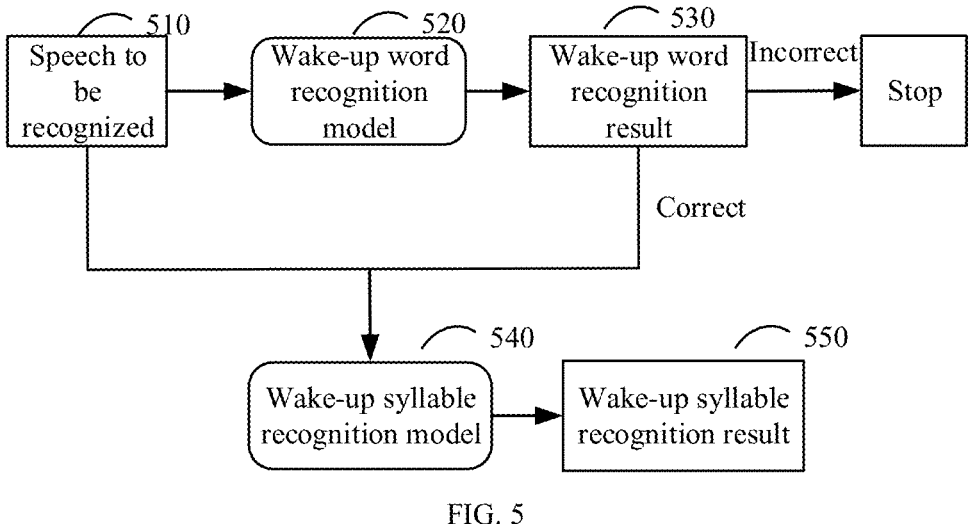
FIG. 5 schematically shows a flowchart of a speech wake-up method according to other embodiments of the present disclosure.

FIG. 5 schematically shows a flowchart of a speech wake-up method according to other embodiments of the present disclosure.

As shown in FIG. 5, a speech to be recognized 510 is input into a wake-up word recognition model 520 to obtain a wake-up word recognition result 530. When it is determined that the wake-up word recognition result 530 represents that the speech to be recognized 510 contains a predetermined wake-up word, the speech to be recognized 510 is input into a wake-up syllable recognition model 540 to obtain a wake-up syllable recognition result 550. When it is deter-mined that the wake-up syllable recognition result 550 represents that the speech to be recognized contains a predetermined syllable, it is determined that the speech to be recognized is a correct wake-up speech. A speech interaction device is awakened and a subsequent human-machine inter-action may be performed. If it is determined that the wake-up word recognition result represents that the speech to be recognized does not contain the predetermined wake-up word, it is determined that the speech to be recognized is an incorrect wake-up speech, then an operation is stopped. When it is determined that the wake-up syllable recognition result represents that the speech to be recognized does not contain the predetermined syllable, it is determined that the speech to be recognized is an incorrect wake-up speech, and the speech interaction device is not awakened.

According to other embodiments of the present disclo-sure, the speech to be recognized may also be input into a wake-up syllable recognition model to obtain a wake-up syllable recognition result. When it is determined that the wake-up syllable recognition result represents that the speech to be recognized contains the predetermined syllable, the speech to be recognized is input into the wake-up word recognition model to obtain a wake-up word recognition result. When it is determined that the wake-up word recog-nition result represents that the speech to be recognized contains the predetermined wake-up word, it is determined that the speech to be recognized is the correct wake-up speech. The speech interaction device is awakened and a subsequent human-machine interaction may be performed. When it is determined that the wake-up syllable recognition result represents that the speech to be recognized does not contain the predetermined syllable, it is determined that the speech to be recognized is an incorrect wake-up speech, and the operation is stopped. When it is determined that the wake-up word recognition result represents that the speech to be recognized contains the predetermined wake-up word, it is determined that the speech to be recognized is an incorrect wake-up speech, and the speech interaction device is not awakened.

According to other embodiments of the present disclo-sure, the speech to be recognized may also be input into the wake-up word recognition model to obtain a wake-up word recognition result, and the speech to be recognized may be input into the wake-up syllable recognition model to obtain a wake-up syllable recognition result. When it is determined that the wake-up word recognition result represents that the speech to be recognized contains the predetermined wake-up word, and that the syllable recognition result represents that the speech to be recognized contains the predetermined syllable, it is determined that the speech to be recognized is the correct wake-up speech. When it is determined that the wake-up word recognition result represents that the speech to be recognized does not contain the predetermined wake-up word, or it is determined that the syllable recognition result represents that the speech to be recognized does not contain the predetermined syllable, it is determined that the speech to be recognized is an incorrect wake-up speech.

According to embodiments of the present disclosure, processing the speech to be recognized using the aforementioned wake-up word recognition model and wake-up syllable recognition model may be applied in scenarios where the number of wake-up words is reduced. In a case of one, two or three wake-up words, it is possible to reduce the false positive rate while ensuring the recognition accuracy.

According to embodiments of the present disclosure, compared with the method of "first performing a syllable recognition on the speech to be recognized using a wake-up syllable model" or the method of "simultaneously performing a syllable recognition on the speech to be recognized using the wake-up syllable model and performing a word recognition on the speech to be recognized using the wake-up word recognition model", in the method of "first performing a word recognition on the speech to be recognized using the wake-up word recognition model", as the wake-up word recognition model has characteristics of a simple network structure and a small amount of calculation, the terminal device may be allowed in a real-time activation state, so that the internal consumption of the speech interaction device as a terminal device may be reduced while ensuring the recognition accuracy.

Figure 6:
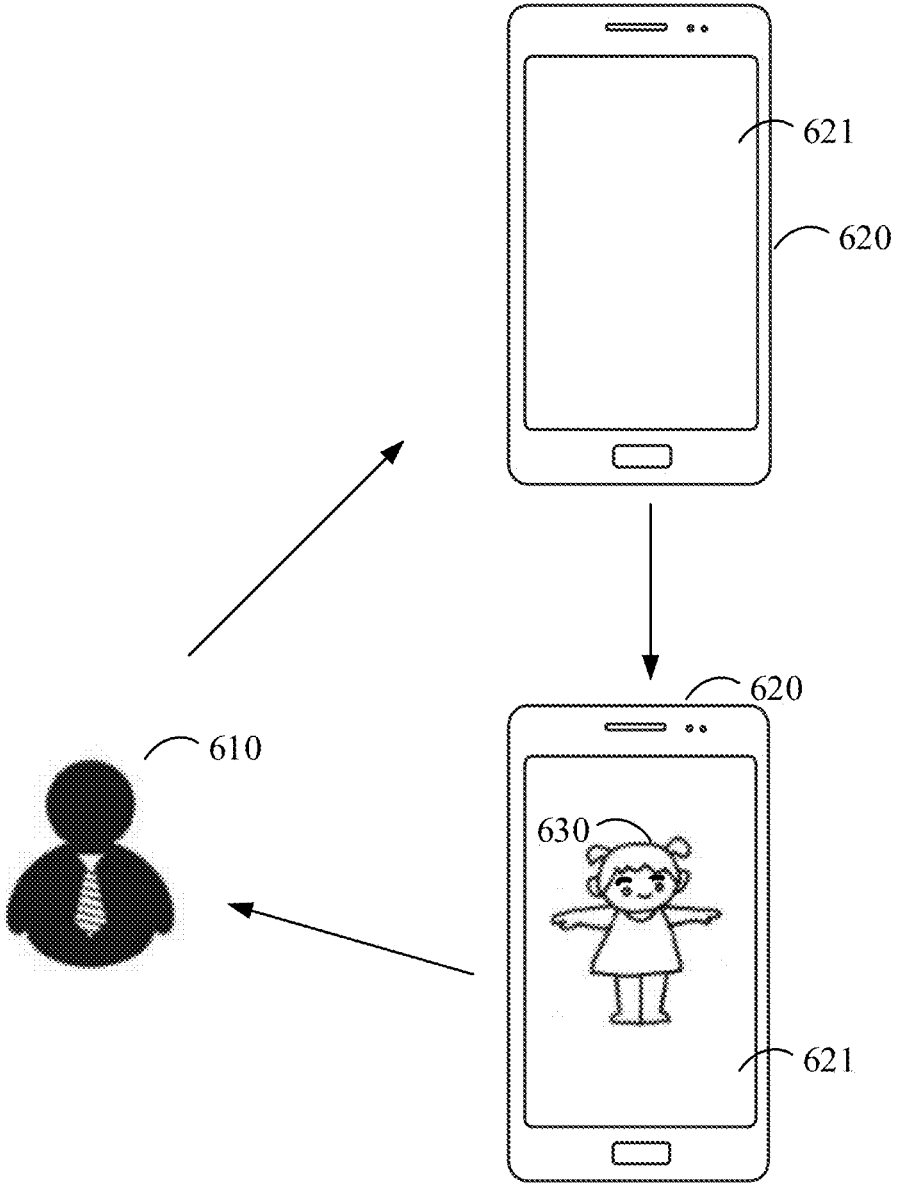
FIG. 6 schematically shows an application diagram of a speech wake-up method according to other embodiments of the present disclosure.

FIG. 6 schematically shows an application diagram of a speech wake-up method according to other embodiments of the present disclosure.

As shown in FIG. 6, a speech to be recognized is sent by a user 610 to a speech interaction device 620. The speech interaction device performs operations of a speech wake-up method on the speech to be recognized by using a wake-up word recognition model and a wake-up syllable recognition model loaded in the speech interaction device 610, so as to determine whether the speech to be recognized is a correct wake-up speech. When it is determined that the speech to be recognized is the correct wake-up speech, a target object 630 is displayed on a display interface 621 of the speech interaction device 620, and the speech interaction device 620 outputs a feedback speech, so that a human-computer interaction may be demonstrated flexibly and vividly.

Figure 7:
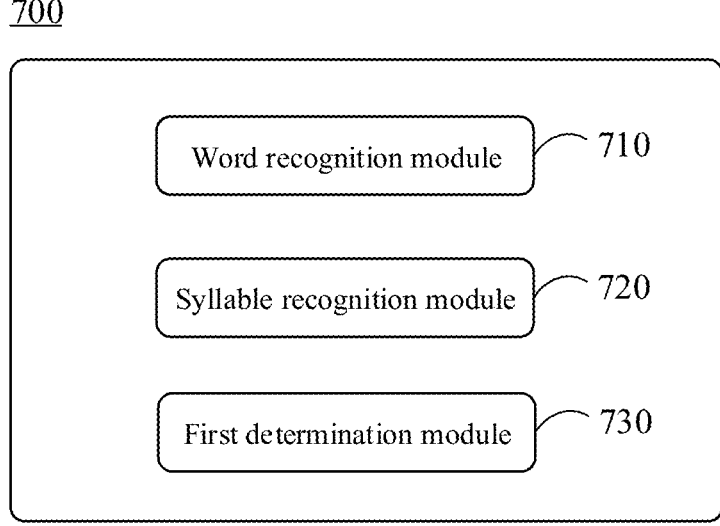
FIG. 7 schematically shows a block diagram of a speech wake-up apparatus according to embodiments of the present disclosure.

FIG. 7 schematically shows a block diagram of a speech wake-up apparatus according to embodiments of the present disclosure.

As shown in FIG. 7, a speech wake-up apparatus 700 includes a word recognition module 710, a syllable recognition module 720, and a first determination module 730.

The word recognition module 710 is used to perform a word recognition on a speech to be recognized to obtain a wake-up word recognition result.

The syllable recognition module 720 is used to perform a syllable recognition on the speech to be recognized to obtain a wake-up syllable recognition result when it is determined that the wake-up word recognition result represents that the speech to be recognized contains a predetermined wake-up word.

The first determination module 730 is used to determine that the speech to be recognized is a correct wake-up speech when it is determined that the wake-up syllable recognition result represents that the speech to be recognized contains a predetermined syllable.

According to embodiments of the present disclosure, the word recognition module includes a convolutional unit, a gating unit, and a word classification unit.

The convolutional unit is used to perform a convolution on the speech to be recognized to obtain a first-level feature vector sequence. The speech to be recognized includes a speech frame sequence, and the first-level feature vector sequence corresponds to the speech frame sequence.

The gating unit is used to perform a gate recurrent operation on the first-level feature vector sequence to obtain a second-level feature vector sequence.

The word classification unit is used to perform a classification on the second-level feature vector sequence to obtain the wake-up word recognition result.

According to embodiments of the present disclosure, the gating unit includes repetitive sub-units as follows.

A first determination sub-unit is used to determine an update gate of a current moment and a candidate hidden layer information of the current moment based on an output vector of a previous moment and an input vector of the current moment, where the input vector of the current moment is a first-level feature vector at the current moment in the first-level feature vector sequence.

A second determination sub-unit is used to determine a hidden layer information of the current moment based on the candidate hidden layer information of the current moment, a hidden layer information of the previous moment, and the update gate of the current moment.

A third determination sub-unit is used to determine an output vector of the current moment based on the hidden layer information of the current moment and a predetermined parameter, where the output vector of the current moment is a second-level feature vector at the current moment in the second-level feature vector sequence.

According to embodiments of the present disclosure, the syllable recognition module includes an extraction unit and a syllable classification unit.

The extraction unit is used to perform a syllable feature extraction on the speech to be recognized to obtain a syllable feature matrix.

The syllable classification unit is used to perform a classification on the syllable feature matrix to obtain the wake-up syllable recognition result.

According to embodiments of the present disclosure, the extraction unit includes an extraction sub-unit, a dimension reduction sub-unit, and an encoding sub-unit.

The extraction sub-unit is used to perform a feature extraction on the speech to be recognized to obtain a feature matrix.

The dimension reduction sub-unit is used to perform a dimension reduction on the feature matrix to obtain a dimension-reduced feature matrix.

The encoding sub-unit is used to perform a multi-stage speech-enhanced encoding on the dimension-reduced feature matrix to obtain the syllable feature matrix.

According to embodiments of the present disclosure, the speech wake-up apparatus further includes a second determination module.

The second determination module is used to determine that the speech to be recognized is an incorrect wake-up speech when it is determined that the wake-up word recognition result represents that the speech to be recognized does not contain the predetermined wake-up word.

According to embodiments of the present disclosure, the predetermined parameter is determined based on a threshold of the number of lightweight parameters.

According to embodiments of the present disclosure, the speech wake-up apparatus further includes a display module and a feedback module.

The display module is used to display a target object on a display interface when it is determined that the speech to be recognized is a correct wake-up speech.

The feedback module is used to output a feedback speech.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor. The memory stores instructions executable by the at least one processor, and the instructions, when executed by the at least one processor, cause the at least one processor to implement the method described in embodiments of the present disclosure.

According to embodiments of the present disclosure, a non-transitory computer-readable storage medium having computer instructions therein is provided, and the computer instructions are used to cause a computer to implement the method described in embodiments of the present disclosure.

According to embodiments of the present disclosure, a computer program product containing a computer program is provided, and the computer program, when executed by a processor, causes the processor to implement the method described in embodiments of the present disclosure.

Figure 8:
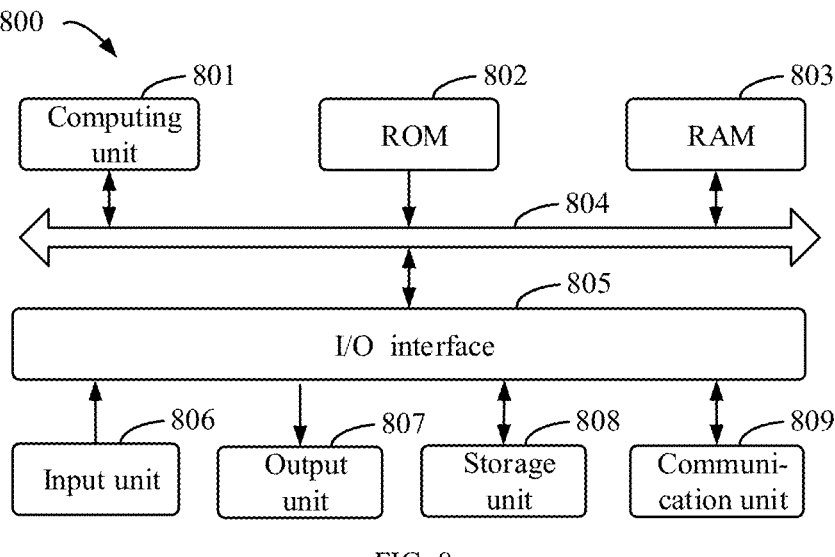
FIG. 8 schematically shows a block diagram of an electronic device suitable for implementing the speech wake-up method according to embodiments of the present disclosure.

FIG. 8 shows a schematic block diagram of an example electronic device 800 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 800 includes a computing unit 801 which may perform various appropriate actions and processes according to a computer program stored in a read only memory (ROM) 802 or a computer program loaded from a storage unit 808 into a random access memory (RAM) 803. In the RAM 803, various programs and data necessary for an operation of the electronic device 800 may also be stored. The computing unit 801, the ROM 802 and the RAM 803 are connected to each other through a bus 804. An input/output (I/O) interface 805 is also connected to the bus 804.

A plurality of components in the electronic device 800 are connected to the I/O interface 805, including: an input unit 806, such as a keyboard, or a mouse; an output unit 807, such as displays or speakers of various types; a storage unit 808, such as a disk, or an optical disc; and a communication unit 809, such as a network card, a modem, or a wireless communication transceiver. The communication unit 809 allows the electronic device 800 to exchange information/data with other devices through a computer network such as Internet and/or various telecommunication networks.

The computing unit 801 may be various general-purpose and/or dedicated processing assemblies having processing and computing capabilities. Some examples of the computing units 801 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 801 executes various methods and processes described above, such as the speech wake-up method. For example, in some embodiments, the speech wake-up method may be implemented as a computer software program which is tangibly embodied in a machine-readable medium, such as the storage unit 808. In some embodiments, the computer program may be partially or entirely loaded and/or installed in the electronic device 800 via the ROM 802 and/or the communication unit 809. The computer program, when loaded in the RAM 803 and executed by the computing unit 801, may execute one or more steps in the speech wake-up method described above. Alternatively, in other embodiments, the computing unit 801 may be used to perform the speech wake-up method by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball)

through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, speech input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. A relationship between the client and the server is generated through computer programs running on the corresponding computers and having a client-server relationship with each other. The server may be a cloud server, also known as a cloud computing server or a cloud host, which is a host product in a cloud computing service system to solve shortcomings of difficult management and weak service scalability existing in a conventional physical host and VPS (Virtual Private Server) service. The server may also be a server of a distributed system or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A speech wake-up method, comprising:
performing a word recognition on a speech to be recognized from a global aspect to obtain a wake-up word recognition result;
performing a syllable recognition on the speech to be recognized from a local aspect to obtain a wake-up syllable recognition result, in response to determining that the wake-up word recognition result represents that the speech to be recognized contains a predetermined wake-up word; and
determining that the speech to be recognized is a correct wake-up speech, in response to determining that the wake-up syllable recognition result represents that the speech to be recognized contains a predetermined syllable,
wherein the performing the word recognition on the speech to be recognized from the global aspect to obtain the wake-up word recognition result comprises:
performing a convolution on the speech to be recognized to obtain a first-level feature vector sequence, wherein the speech to be recognized comprises a speech frame sequence, and the first-level feature vector sequence corresponds to the speech frame sequence;
performing a gate recurrent operation on the first-level feature vector sequence to obtain a second-level feature vector sequence, and
performing a classification on the second-level feature vector sequence to obtain the wake-up word recognition result,
wherein the performing the gate recurrent operation on the first-level feature vector sequence to obtain the second-level feature vector sequence comprises repeatedly performing an operation comprising:
determining an update gate of a current moment and a candidate hidden layer information of the current moment based on an output vector of a previous moment and an input vector of the current moment, wherein the input vector of the current moment is a first-level feature vector at the current moment in the first-level feature vector sequence;
determining a hidden layer information of the current moment based on the candidate hidden layer information of the current moment, a hidden layer information of the previous moment, and the update gate of the current moment; and
determining an output vector of the current moment based on the hidden layer information of the current moment and a predetermined parameter, wherein the output vector of the current moment is a second-level feature vector at the current moment in the second-level feature vector sequence,
wherein the predetermined parameter is a projection parameter, the predetermined parameter is determined based on a threshold of the number of lightweight parameters, the threshold of the number of lightweight parameters refer to a parameter setting benchmark, so that a size of the predetermined parameter is less than or equal to the threshold of the number of lightweight parameters.

2. The method according to claim 1, wherein the performing a syllable recognition on the speech to be recognized from a local aspect to obtain a wake-up syllable recognition result in response to determining that the wake-up word recognition result represents that the speech to be recognized contains a predetermined wake-up word comprises:
performing a syllable feature extraction on the speech to be recognized to obtain a syllable feature matrix; and
performing a classification on the syllable feature matrix to obtain the wake-up syllable recognition result.

3. The method according to claim 2, wherein the performing a syllable feature extraction on the speech to be recognized to obtain a syllable feature matrix comprises:
performing a feature extraction on the speech to be recognized to obtain a feature matrix;
performing a dimension reduction on the feature matrix to obtain a dimension-reduced feature matrix; and
performing a multi-stage speech-enhanced encoding on the dimension-reduced feature matrix to obtain the syllable feature matrix.

4. The method according to claim 1, further comprising:

determining that the speech to be recognized is an incorrect wake-up speech, in response to determining that the wake-up word recognition result represents that the speech to be recognized does not contain the predetermined wake-up word.

5. The method according to claim 1, further comprising:

displaying a target object on a display interface in response to determining that the speech to be recognized is a correct wake-up speech; and outputting a feedback speech.

6. An electronic device, comprising:

at least one processor; and a memory communicatively connected to the at least one processor, wherein the memory stores instructions executable by the at least one processor, and the instructions, when executed by the at least one processor, cause the at least one processor to:

perform a word recognition on a speech to be recognized from a global aspect to obtain a wake-up word recognition result;

perform a syllable recognition on the speech to be recognized from a local aspect to obtain a wake-up syllable recognition result, in response to determining that the wake-up word recognition result represents that the speech to be recognized contains a predetermined wake-up word; and determine that the speech to be recognized is a correct wake-up speech, in response to determining that the wake-up syllable recognition result represents that the speech to be recognized contains a predetermined syllable, wherein the at least one processor is further configured to:

perform a convolution on the speech to be recognized to obtain a first-level feature vector sequence, wherein the speech to be recognized comprises a speech frame sequence, and the first-level feature vector sequence corresponds to the speech frame sequence;

perform a gate recurrent operation on the first-level feature vector sequence to obtain a second-level feature vector sequence; and perform a classification on the second-level feature vector sequence to obtain the wake-up word recognition result, wherein the at least one processor is further configured to repeatedly perform an operation comprising:

determining an update gate of a current moment and a candidate hidden layer information of the current moment based on an output vector of a previous moment and an input vector of the current moment, wherein the input vector of the current moment is a first-level feature vector at the current moment in the first-level feature vector sequence;

determining a hidden layer information of the current moment based on the candidate hidden layer information of the current moment, a hidden layer information of the previous moment, and the update gate of the current moment; and determining an output vector of the current moment based on the hidden layer information of the current moment and a predetermined parameter, wherein the output vector of the current moment is a second-level feature vector at the current moment in the second-level feature vector sequence, wherein the predetermined parameter is a projection parameter, the predetermined parameter is determined based on a threshold of the number of lightweight parameters, the threshold of the number of lightweight parameters refer to a parameter setting benchmark, so that a size of the predetermined parameter is less than or equal to the threshold of the number of lightweight parameters.

7. A non-transitory computer-readable storage medium having computer instructions therein, wherein the computer instructions are configured to cause a computer to:

perform a word recognition on a speech to be recognized from a global aspect to obtain a wake-up word recognition result;

perform a syllable recognition on the speech to be recognized from a local aspect to obtain a wake-up syllable recognition result, in response to determining that the wake-up word recognition result represents that the speech to be recognized contains a predetermined wake-up word; and determine that the speech to be recognized is a correct wake-up speech, in response to determining that the wake-up syllable recognition result represents that the speech to be recognized contains a predetermined syllable, wherein the computer instructions are further configured to cause the computer to:

perform a convolution on the speech to be recognized to obtain a first-level feature vector sequence, wherein the speech to be recognized comprises a speech frame sequence, and the first-level feature vector sequence corresponds to the speech frame sequence;

perform a gate recurrent operation on the first-level feature vector sequence to obtain a second-level feature vector sequence; and perform a classification on the second-level feature vector sequence to obtain the wake-up word recognition result, wherein the computer instructions are further configured to cause the computer to repeatedly perform an operation comprising:

determining an update gate of a current moment and a candidate hidden layer information of the current moment based on an output vector of a previous moment and an input vector of the current moment, wherein the input vector of the current moment is a first-level feature vector at the current moment in the first-level feature vector sequence;

determining a hidden layer information of the current moment based on the candidate hidden layer information of the current moment, a hidden layer information of the previous moment, and the update gate of the current moment; and determining an output vector of the current moment based on the hidden layer information of the current moment and a predetermined parameter, wherein the output vector of the current moment is a second-level feature vector at the current moment in the second-level feature vector sequence, wherein the predetermined parameter is a projection parameter, the predetermined parameter is determined based on a threshold of the number of lightweight parameters, the threshold of the number of lightweight parameters refer to a parameter setting benchmark, so that a size of the predetermined parameter is less than or equal to the threshold of the number of lightweight parameters.

8. The electronic device according to claim 6, wherein the at least one processor is further configured to:

perform a syllable feature extraction on the speech to be recognized to obtain a syllable feature matrix; and perform a classification on the syllable feature matrix to obtain the wake-up syllable recognition result.

9. The electronic device according to claim 8, wherein the at least one processor is further configured to:

perform a feature extraction on the speech to be recognized to obtain a feature matrix;

perform a dimension reduction on the feature matrix to obtain a dimension-reduced feature matrix; and perform a multi-stage speech-enhanced encoding on the dimension-reduced feature matrix to obtain the syllable feature matrix.

10. The electronic device according to claim 6, wherein the at least one processor is further configured to:

determine that the speech to be recognized is an incorrect wake-up speech, in response to determining that the wake-up word recognition result represents that the speech to be recognized does not contain the predetermined wake-up word.

11. The electronic device according to claim 6, wherein the at least one processor is further configured to:

display a target object on a display interface in response to determining that the speech to be recognized is a correct wake-up speech; and output a feedback speech.

12. The non-transitory computer-readable storage medium according to claim 7, wherein the computer instructions are further configured to cause the computer to:

perform a syllable feature extraction on the speech to be recognized to obtain a syllable feature matrix; and perform a classification on the syllable feature matrix to obtain the wake-up syllable recognition result.

* * * * *